United States Patent Office 3,632,565
Patented Jan. 4, 1972

---

3,632,565
WATER-INSOLUBLE ARYL-AZO ARYL DYESTUFFS CONTAINING A THIENYL OR FURYL CARBOXAMIDO GROUP
Hans-Joerg Angliker and Richard Peter, Basel, Switzerland, assignors to Ciba Limited, Basel, Switzerland
No Drawing. Filed Sept. 4, 1968, Ser. No. 757,478
Claims priority, application Switzerland, Sept. 7, 1967, 12,524/67
Int. Cl. C09b 29/08; D06p 1/08
U.S. Cl. 260—152
8 Claims

ABSTRACT OF THE DISCLOSURE

Water insoluble azo dyestuffs of the formula

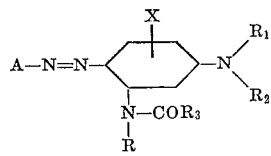

in which A represents the radical of a diazo component, R represents an alkyl group having at most 4 carbon atoms, or a hydrogen atom, $R_1$ represents a hydrogen atom or an alkyl group that may be substituted, $R_2$ represents an alkyl group that may be substituted, $R_3$ represents a five-membered heterocyclic radical which must be substituted when it represents a furan ring, and X represents a hydrogen atom or an alkyl, alkoxy, aryloxy or arylmercapto group are useful for dyeing polyester fibers orange to violet shades of excellent fastness to light and sublimation.

---

The present invention is based on the observation that valuable water-insoluble azo dyestuffs of the formula

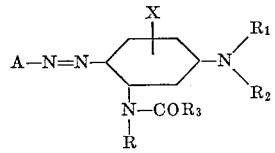

in which A represents the residue of a diazo component, R represents an alkyl group having not more than 4 carbon atoms or a hydrogen atom, $R_1$ represents a hydrogen atom or an alkyl group that may be substituted, $R_2$ represents an alkyl group that may be substituted, $R_3$ represents a five-membered heterocyclic residue which must be substituted when it represents a furan ring, and X represents a hydrogen atom or an alkyl, alkoxy, aryloxy or arylmercapto group, may be obtained by coupling the diazo compound of an amine with a coupling component of the formula

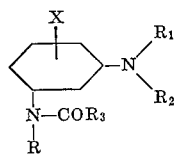

in which X, R, $R_1$, $R_2$ and $R_3$ have the meanings given above.

Dyestuffs that are of special interest are those corresponding to the formula

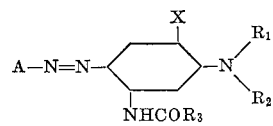

in which X, A, $R_1$, $R_2$ and $R_3$ have the meanings given above and A represents a substituted benzene residue or a monocyclic or bicyclic heterocyclic residue. Dyestuffs in which X represents a methyl or methoxy group or a hydrogen atom and $R_3$ represents either a substituted furan ring or a substituted or unsubstituted thiophene ring are especially preferred.

The groups $R_1$ and $R_2$ may be alkyl groups containing 1 to 4, preferably 2 to 4 carbon atoms, for example, methyl, ethyl, n-propyl or n-butyl groups, which may be substituted in the usual manner, with groups such as $C_{1-2}$ alkoxy, hydroxy, nitro, $C_{1-3}$ carbalkoxy, formylamino, acetaylamino, acetoxy, diacetoxy, $C_{1-2}$ alkylsulfonyl, $C_{1-4}$ alkyloxycarbonyloxy, β-(p-chlorobenzenesulphonyl)-ethyl, β-methyl-carbamyloxyethyl, β-phenylcarbamyloxyethyl, γ-acetamido-propyl, β-(para-nitrophenoxy)-ethyl, β - (parahydroxyphenoxy) - ethyl, β-(β'-acetylethoxycarbonyl)-ethyl, β-[(β'-cyano)-ethoxycarbonyl] - ethyl, β-[(β'-hydroxy)ethoxycarbonyl] - ethyl, β-[(β'-methoxy)ethoxycarbonyl]-ethyl, β - [(β'-acetoxy)ethoxycarbonyl]-ethyl, β-carboxyethyl, β-acetylethyl, γ-aminopropyl, β-diethylaminoethyl, β-cyanoacetoxyethyl, β-benzoyl-hydroxyethyl, β-phenoxy-benzoyl-hydroxyethyl and only one of $R_1$ or $R_2$ being hydrogen at any one time, for example, one or more benzyl or β-phenylethyl groups, halogenated alkyl groups, for example, β-chloroethyl, β,β,β-trifluoroethyl or β,γ-dichloropropyl groups, β-cyanoethyl groups, alkoxyalkyl groups, for example, β-ethoxyethyl or δ-methoxybutyl groups, hydroxyalkyl groups, for example, β-hydroxyethyl and β,γ-dihydroxypropyl groups, nitroalkyl groups, for example, β-nitroethyl groups, carbalkoxy groups, for example, β-carbo-(methoxy-, ethoxy or propoxy)-ethyl groups (in which the terminal alkyl group may carry cyano, carbalkoxy, acyloxy and amino groups) and β- or γ-carbo-(methoxy- or ethoxy)-propyl groups, acylaminoalkyl groups, for example, β-(acetyl- or formyl)-aminoethyl groups, acyloxyalkyl groups, for example, β-acetoxyethyl and β,γ-diacetoxypropyl groups, β-(alkyl- or aryl)-sulphonylalkyl groups, for example, β-methanesulfonylethyl, β-ethanesulphonylethyl or β-(para-chlorobenzenesulphonyl)-ethyl groups, alkyl or arylcarbamoyloxyalkyl groups, for example, β-methyl-carbamyloxyethyl and β-phenylcarbamyloxyethyl groups, alkyloxycarbonyloxyalkyl groups, for example, β-(methoxy-, ethoxy- or isopropyloxy)-carbonyloxyethyl, γ-acetamidopropyl, β-(para-nitrophenoxy)-ethyl, β-(para-hydroxyphenoxy)ethyl, β-(β'-acetylethoxycarbonyl)-ethyl, β-[(β'-cyano, hydroxy-, methoxy- or acetoxy-)ethoxycarbonyl]-ethyl, cyanoalkoxyalkyl, β-carboxyethyl, β-acetylethyl, γ-aminopropyl, β-diethylaminoethyl, β-cyanoacetoxyethyl and β-benzoyl- or β - (para - alkoxy- or phenoxy-benzoyl)-hydroxyethyl groups.

The groups $R_1$ and $R_2$ preferably contain not more than 18 carbon atoms. The residues $R_1$ and $R_2$ are preferably alkyl groups substituted by hydroxy, alkoxy, cyanoalkoxy, acyloxy or cyano groups.

The residue $R_3$ is a heterocyclic ring such as thionyl, tetrahydrofuryl, tetrahydrothionyl and substituted furyl or thionyl, wherein the substitutent is selected from the group consisting of alkyl of up to 4 carbon atoms, chloro, carboxy, carbomethoxy, paranitrophenyl and parachlorophenyl, and which must be substituted when it contains an oxygen atom as hetero atom. Suitable substituents are, for example, aryl groups, alkyl groups containing not more than 4 carbon atoms, chlorine atoms or carboxyl groups, or an alkylene chain bound on both sides to the hetero ring.

The diazo components preferably correspond to the formula

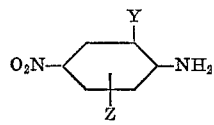

in which Y represents a hydrogen or a halogen atom or an alkyl, alkoxy, nitro, cyano, carbalkoxy or arylsulphonyl group and Z represents a hydrogen or a halogen atom or an alkyl, alkoxy, phenoxy, cyano or trifluoromethyl group. More particularly, Y may be hydrogen, chloro, bromo, lower alkyl, lower alkoxy, nitro, cyano, lower carbalkoxy or phenylsulphonyl, and Z may be hydrogen, chloro, bromo, lower alkyl, lower alkoxy, phenoxy, cyano or trifluoromethyl.

The following amines are given as examples of diazo components:

1-amino-4-chlorobenzene,
1-amino-4-bromobenzene,
1-amino-4-methylbenzene,
1-amino-4-nitrobenzene,
1-amino-4-cyanobenzene,
1-amino-2,5-dicyanobenzene,
1-amino-4-methylsulphonylbenzene,
1-amino-4-carbomethoxybenzene,
1-amino-2,4-dichlorobenzene,
1-amino-2,4-dibromobenzene,
1-amino-2-methyl-4-chlorobenzene,
1-amino-2-trifluoromethyl-4-chlorobenzene,
1-amino-2-cyano-4-chlorobenzene,
1-amino-2-carbomethoxy-4-chlorobenzene,
1-amino-2-carbomethoxy-4-nitrobenzene,
1-amino-2-chloro-4-cyanobenzene,
1-amino-2-chloro-4-nitrobenzene,
1-amino-2-phenoxy-4-nitrobenzene,
1-amino-2-chloro-4-carbethoxybenzene,
1-amino-2-chloro-4-methylsulphonylbenzene,
1-amino-2-methylsulphonyl-4-chlorobenzene,
1-amino-2-methylsulphonyl-4-nitrobenzene,
1-amino-2,4-dinitrobenzene,
1-amino-2,4-dicyanobenzene,
1-amino-2-cyanomethylsulphonylbenzene,
1-amino-2,6-dichloro-4-cyanobenzene,
1-amino-2,6-dichloro-4-nitrobenzene,
1-amino-2,4-dicyano-6-chlorobenzene,
1-amino-2,4-dicyano-6-chlorobenzene,
1-amino-2,5,6-trinitrobenzene,
1-amino-2,4-dinitro-6-chlorobenzene, and especially
1-amino-2-cyano-4-nitrobenzene,
4-aminoazobenzene,
4-amino-3-nitro-1,1'-azobenzene,
4-amino-3-nitro-4'-chloro-1,1'-azobenzene,
4-amino-3-nitro-2'-chloro-1,1'-azobenzene,
4-amino-3-nitro-2'-methoxy-1,1'-azobenzene, and
4-amino-3-nitro-4'-methyl-1,1'-azobenzene.

The following are given as examples of heterocyclic diazo components:

2-aminothiazole,
2-amino-5-nitrothiazole,
2-amino-5-cyanothiazole,
2-amino-4-methyl-5-nitrothiazole,
2-amino-4-methylthiazole,
2-amino-4-phenylthiazole,
2-amino-(4'-chloro)-phenylthiazole,
2-amino-(4'-nitro)-phenylthiazole,
2-amino-6-chlorobenzthiazole,
2-amino-6-cyanobenzthiazole,
2-amino-6-nitrobenzthiazole,
2-amino-1,3,4-thiadiazole,
2-amino-1,3,5-thiadiazole,
3-methylmercapto-5-amino-1,2,4-thiadiazole, and
3-methylsulphonyl-5-amino-1,2,4-thiadiazole.

The coupling components preferably correspond to the formula

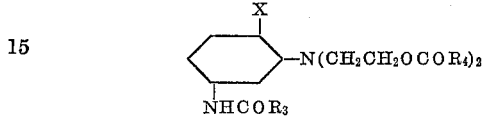

in which X represents a hydrogen atom or an alkyl or alkoxy group, such as hydrogen, methoxy, ethoxy or methyl, $R_3$ represents a five-membered heterocyclic residue, for example, an aromatic residue, for example, a furan or thiophene residue or a saturated residue, for example, a tetrahydrofuran or tetrahydrothiophene residue and $R_4$ represents an alkyl, lower alkyl phenyl or heterocyclic residue.

The following coupling components are given as examples:

N,N-diethyl-3-(2'-thienoylamino)-aniline,
N,N-di-(cyanoethyl)-3-(2'-thienoylamino)-aniline,
N,N-di-(acetoxyethyl)-3-(2'-thienoylamino)-aniline,
N,N-di-(acetoxyethyl)-3-(5'-carbomethoxy-2'-thienoylamino)-aniline,
N,N-di(acetoxyethyl)-3-(5'-para-nitrophenyl-2'-furoylamino)-aniline,
N,N-di-(acetoxyethyl)-3-(2'-tetrahydrofuroylamino)-aniline,
N,N-di-(acetoxyethyl)-3-(2'-tetrahydrothienoylamino)-aniline,
N-ethyl-N-acetoxyethyl-3-(2'-thienoylamino)-aniline,
N-cyanoethyl-N-acetoxyethyl-3-(2'-thienoylamino)-aniline,
N-cyanoethyl-N-benzoyloxyethyl-3-(2'-thienoylamino)-aniline,
N-ethyl-N-cyanoethyl-3-(2'-thienoylamino)-aniline,
N,N-di-(acetoxyethyl)-3-(2'-thienoylamino)-6-methoxyaniline, and
N,N-di-(acetoxyethyl)-3-(2'-tetrahydrofuroylamino)-6-ethoxyaniline.

The residues represented by the symbol $R_3$ in the coupling components may also be derived from sulpholanecarboxylic acids of the formula

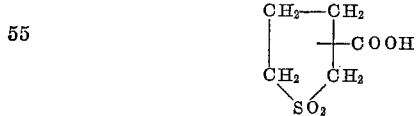

which may carry further substituents bound to the sulpholane ring, or they may be derived from pyrrole-2-carboxylic acid.

The single coupling component may also be replaced by a mixture of different coupling components. In many cases, the affinity and building-up properties of the dyestuff mixtures so obtained are better than those of the unitary dyestuffs.

Diazotization of the above-mentioned diazo components may be carried out by methods known per se, for example, with the aid of a mineral acid, especially hydrochloric acid, and sodium nitrite, or, for example, with a solution of nitrosyl-sulphuric acid in concentrated sulphuric acid.

Coupling may also be carried out by a method known per se, for example, in a neutral to acid medium, if necessary, in the presence of sodium acetate or a similar buffer which influences the rate of coupling, or a catalyst, for example, pyridine or a salt thereof.

After coupling, the dyestuffs formed can easily be separated from the coupling mixture, for example, by filtration, because they are substantially insoluble in water.

The dyestuffs of the present invention are eminently suitable for dyeing and printing materials, especially fibres and fabrics, made, for example, from cellulose triacetate, polyacrylonitrile and polyamides, but especially from aromatic polyesters. They produce on these materials strong dyeings possessing excellent properties of fastness, especially excellent fastness to light, sublimation and rubbing. The dyeings may also be subjected to "permanent press" processing, for example, the Koratron process. Dyeing produced with the new dyestuffs which have been thus treated display excellent fastness to wet treatments and heat.

For dyeing, the new dyestuffs are advantageously used in a state of fine division, and dyeing is carried out in the presence of a dispersing agent, for example, soap, sulphite cellulose waste liquor or a synthetic detergent, or a combination of different wetting and dispersing agents. Prior to dyeing, it is generally advantageous to convert the dyestuff into a dyeing preparation which contains a dispersing agent and the dyestuff in a form such that a fine dispersion is obtained when the preparation is diluted with water. Such dyestuff preparations may be obtained in a known manner, for example, by reprecipitating the dyestuff from sulphuric acid and grinding the suspension so obtained with sulphite cellulose waste liquor. If necessary, they may also be obtained by grinding the dyestuff in a highly efficient grinding device in the dry or wet state in the presence or absence of a dispersing agent.

To obtain stronger dyeings on polyethylene terephthalate fibres it is generally advantageous to add a swelling agent to the dyebath, or more especially to carry out the dyeing process under superatmospheric pressure at a temperature above 100° C., for example, at 120° C. Suitable swelling agents are aromatic carboxylic acids, for example, benzoic acid and salicyclic acid; phenols for example, ortho- or para-hydroxydiphenyl; aromatic halogen compounds, for example, chlorobenzene, orthodichlorobenzene and trichlorobenzene; and phenylmethylcarbinol or diphenyl. When carrying out the dyeing process under superatmospheric pressure it is generally advantageous to render the dyebath slightly acidic, for example, by the addition of a weak acid, for example, acetic acid.

By virtue of their fastness to alkali, the new dyestuffs are also specially suitable for application by the so-called thermofixation process in which the material to be dyed is impregnated at a temperature not exceeding 60° C. with an aqueous dispersion of the dyestuff which advantageously contains 1 to 50% of urea and a thickening agent, especially sodium alginate, and then squeezed in the usual manner. The impregnated material is advantageously squeezed so as to retain 50 to 100% of its dry weight of dye-liquor.

To fix the dyestuff, the material so impregnated is heated to a temperature above 100° C., for example, to a temperature within the range of from 180 to 220° C., advantageously after drying, for example, in a current of warm air.

The aforementioned thermofixation process is especially suitable for the dyeing of union fabrics made from polyester fibres and cellulosic fibres, especially cotton. In this case, in addition to the dyestuffs of the invention, the padding liquor contains dyestuffs suitable for dyeing cotton, especially vat dyestuffs, or reactive dyestuffs, that is to say, dyestuffs capable of being fixed on the cellulosic fibre with formation of a chemical bond, for example, dyestuffs which contain a chlorotriazine or chlorodiazine residue. In the latter case, it is generally advantageous to add an agent capable of binding acid to the padding liquor, for example, an alkali metal carbonate, an alkali metal phosphate, an alkali metal borate or an alkali metal perborate, or mixtures thereof. When using vat dyestuffs, the padded fabric must be treated after the heat treatment with an aqueous alkaline solution of one of the reducing agents commonly used in vat dyeing.

By virtue of the fact that the dyestuffs of the invention reserve well on wool, they are eminently suitable for dyeing union fabrics made from polyester fibre and wool.

The dyeings obtained are advantageously subjected to an after-treatment, for example, by heating with an aqueous solution of a non-ionic detergent.

The dyestuffs may also be applied by printing processes. In this method of application a printing paste is used which contains, for example, in addition to the usual printing adjuvants, for example, thickening and wetting agents, the finely divided dyestuff, if necessary, in admixture with one of the above-mentioned cotton dyestuffs, if necessary, together with urea and/or an agent capable of binding acid.

The following examples illustrate the invention. Unless otherwise stated, the parts and percentages are by weight.

EXAMPLE 1

0.7 part of sodium nitrite is introduced into 15 parts of sulphuric acid and the batch is stirred. 1.63 parts of 2-cyano-4-nitroaniline are then added at a temperature of 20 to 25° C., the whole is stirred for one hour, discharged on to 100 parts of ice and the excess of nitrite is destroyed with sulphamic acid.

A solution of 3.9 parts of N-bis-acetoxyethyl-3-thienoylaminoaniline in 25 parts by volume of dimethylformamide is added dropwise to the solution so obtained at a temperature not exceeding 10° C., the batch is stirred for three hours and then neutralized with 30% NaOH. The dyestuff is then isolated by filtration and dried. It dyes polyester a violet shade.

EXAMPLE 2

1.73 parts of 2-chloro-4-nitroaniline was mixed with 20 parts of water and 3 parts by volume of concentrated hydrochloric acid, the batch is cooled to 0° C. and then diazotization is effected with 6 parts by volume of 2 N-sodium nitrite solution. The batch is stirred for one hour, filtered, and the excess of nitrite is destroyed with sulphamic acid.

A solution of 3.9 parts of N-bis-acetoxyethyl-3-thienoylaminoaniline in 25 parts by volume of dimethylformamide is added dropwise to the solution so obtained at a temperature of 0 to 10° C., the batch is stirred for 3 hours and is then neutralized with 30% sodium hydroxide solution. The dyestuff of the formula

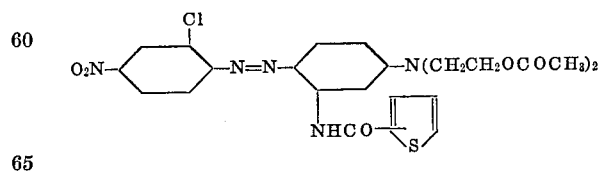

is isolated by filtration and dried. It dyes polyester fibres a bluish red shade possessing excellent fastness to light and sublimation.

The following table lists components for further dyestuffs. The dyestuffs may be obtained by coupling the diazo compounds of the anilines listed in Column I with the coupling components listed in Column II. The shades obtained on polyester fibres are indicated in Column III.

| | I | II | III |
|---|---|---|---|
| 1 | 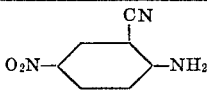 | 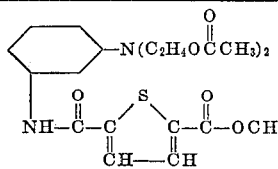 | Violet. |
| 2 | 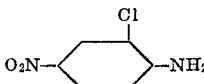 | Same as above | Bluish-red. |
| 3 | 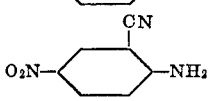 | 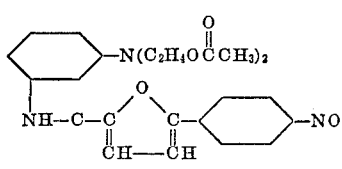 | Violet. |
| 4 | 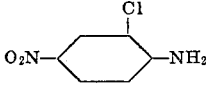 | Same as above | Bluish-red. |
| 5 | 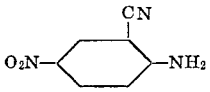 | 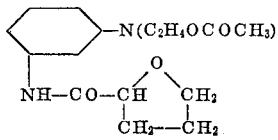 | Violet. |
| 6 | 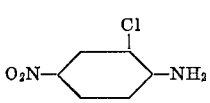 | Same as above | Bluish-red. |
| 7 |  | 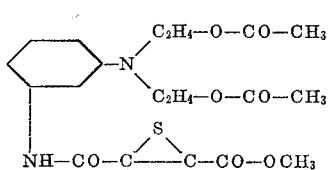 | Red. |
| 8 | 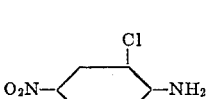 | 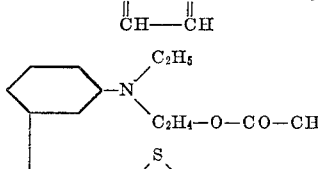 | Bluish-red. |
| 9 |  | 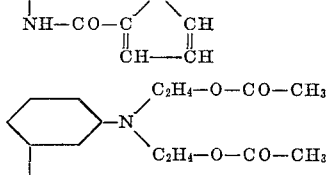 | Red. |
| 10 |  | 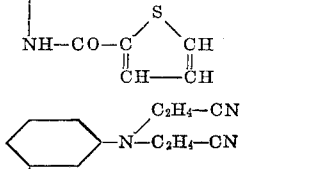 | Red. |
| 11 |  | Same as above | Bluish-red. |
| 12 | Same as above | 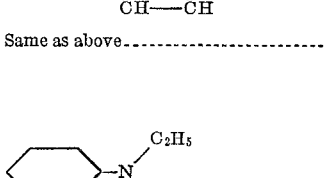 | Violet. |

| | I | II | III |
|---|---|---|---|
| 13 | O₂N—⟨ ⟩—NH₂ | ⟨ ⟩—N(CH₃)₂ ; NH—CO—C=C(S)(CO—OCH₃), CH—CH | Red. |
| 14 | O₂N—⟨Cl⟩—NH₂ | ⟨ ⟩—N(C₂H₄—O—CO—CH₃)(C₂H₄—CN) ; NH—CO—C=C(S)(O—CO—CH₃), CH—CH | Red. |
| 15 | O₂N—C(HC=N)S—C—NH₂ | ⟨ ⟩—N(C₂H₄—O—CO—CH₃)₂ ; NH—CO—C=C(S)(CH), CH—CH | Blue. |
| 16 | C₆H₅—C(N=N)S—C—NH₂ | Same as above | Red. |
| 17 | CH₃O₂S—⟨Cl⟩—NH₂ | ⟨ ⟩—N(C₂H₄—O—CO—CH₃)₂ ; NH—CO—C=C(S)(CO—OCH₃), CH—CH | Orange. |
| 18 | H₅C₂O—⟨benzothiazole⟩—C—NH₂ | Same as above | Red. |
| 19 | O₂N—⟨ ⟩—NH₂ | ⟨ ⟩—N(C₂H₄—O—CO—CH₃)₂ ; NH—CO—C=C(O)(C₆H₄—NO₂), CH—CH | Bluish-red. |
| 20 | Same as above | Same as above | Red. |
| 21 | O₂N—⟨CN⟩—NH₂ | ⟨ ⟩—N(C₂H₄—CN)(C₂H₂—CN) ; NH—CO—C=C(O)(C₆H₄—NO₂), CH—CH | Bluish-red. |
| 22 | O₂N—⟨Cl⟩—NH₂ | ⟨ ⟩—N(C₂H₄—CN)₂ ; NH—CO—C=C(O)(C₆H₄—Cl), CH—CH | Red. |

| | I | II | III |
|---|---|---|---|
| 23 | O₂N—⟨ ⟩—NH₂ with NO₂ and Cl substituents | ⟨ ⟩ with OCH₃, N(C₂H₅)₂, and NH—CO—C(=CH—CH=)S—C—CO—OCH₃ | Blue. |
| 24 | O₂N—⟨ ⟩—NH₂ with CN substituent | ⟨ ⟩ with CH₃, N(CH₃)₂, and NH—CO—C(=CH—CH=)S—C—COCH₃ | Bluish-violet. |

PREPARATION OF THE COUPLING COMPONENTS (I) N-bis-(acetoxyethyl-3-(2'-thienoylamino)-aniline (a) N-bis-acetoxyethyl-3-nitroaniline.—226 parts of N-bis-β-hydroxyethyl-3-nitroaniline, obtainable according to the process described in Swiss patent specification No. 171,721, together with 250 parts of acetic anhydride, are heated for 3 hours at 130° C., the glacial acetic acid is removed in vacuo, and the residue is distilled in a high vacuum. The product of the formula

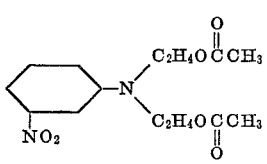

is obtained.

Calculated (percent): 54.19; H, 5.85; N, 9.03. Found (percent): 54.25; H, 5.78; N, 9.05.

(b) N-bis-β-acetoxyethyl-3-aminoaniline.—620 parts of N-bis-β-acetoxyethyl-3-nitroaniline are hydrogenated in 2,000 parts of absolute alcohol in the presence of Pd/carbon, the solvent is removed in vacuo, and the residue is distilled in a high vacuum. The product of the formula

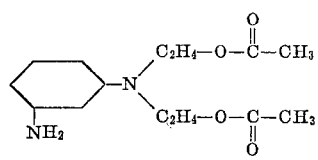

is obtained.

(c) 28 parts of N-bis-βacetoxyethyl-3-aminoaniline are dissolved in 100 parts by volume of pyridine and then 15.5 parts of thiophene-2-carboxylic acid chloride are added dropwise at a temperature of 10 to 15° C. The batch is stirred for 2 hours, discharged into ice and extracted with chloroform. The chloroform solution is washed well, dried, and the solvent is then removed in vacuo.

(II) N-bis-(acetoxyethyl)-3-(5-carbomethoxy-2'-thienoylamino)-aniline 21 parts of thiophene-2-carboxylic acid chloride-5-carboxylic acid methylester are used instead of 15.5 parts of thiophene-2-carboxylic acid chloride.

(III) N-bis-(acetoxyethyl)-3-(5'-para-nitrophenyl-2'-furoylamino)-aniline

The product of the formula

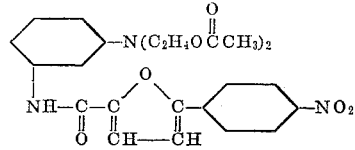

is obtained by replacing the 15.5 parts of thiophene-2-carboxylic acid chloride in Example II with 27 parts of 5-(para-nitrophenyl)-furan-2-carboxylic acid chloride.

(IV) N-bis-(acetoxyethyl)-3-(2'-furoylamino)-aniline 14 parts of furan-2-carboxylic acid chloride are used instead of 15.5 parts of thiophene-2-carboxylic acid chloride.

(V) N-bis-(acetoxyethyl)-3-(2'-tetrahydrofuroylamino)-aniline 14.5 parts of tetrahydrofuran-2-carboxylic acid chloride are used instead of 15.5 parts of thiophene-2-carboxylic acid chloride.

The other coupling components may be obtained in an analogous manner.

Dyeing procedure: 1 part of the dyestuff obtained in the manner described in Example 1 is ground wet with 2 parts of a 50% aqueous solution of the sodium salt of 1,1' - dinaphthylmethane - 2,2' - disulphonic acid and the batch is dried.

The dyestuff preparation so obtained is mixed with 40 parts of a 10% aqueous solution of the sodium salt of N benzyl-γ-heptadecylbenzimidazole disulphonic acid, and then 4 parts of a 40% acetic acid solution are added. A dyebath of 4,000 parts is prepared therefrom by dilution with water.

100 parts of cleaned polyester fibre material are entered into this dyebath at 50° C., the temperature is raised to 120 to 130° C. within half an hour and dyeing is carried out for one hour at that temperature in a closed vessel. The material is then rinsed well. A strong, violet dyeing possessing excellent fastness to light and sublimation is obtained.

We claim:

1. A water-insoluble azo dyestuff of the formula

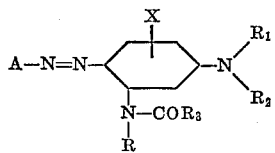

in which A represents a diazo component of the benzene series, R represents hydrogen or alkyl having up to 4 carbon atoms, $R_1$ and $R_2$ each represents hydrogen, unsubstituted or substituted alkyl containing up to 4 carbon atoms wherein the substituent is selected from the group consisting of chloro, cyano, $C_{1-2}$ alkoxy, hydroxy, nitro, $C_{1-3}$ carbalkoxy, formylamino, acetylamino, acetoxy, diacetoxy $C_{1-2}$ alkylsulfonyl, $C_{1-4}$ alkyloxycarbonyloxy, β-(p-chlorobenzensulfonyl)-ethyl, β - methyl - carbamyloxyethyl, β-phenylcarbamyloxyethyl, γ-acetamido-propyl, β-(para-nitrophenoxy)-ethyl, β - (para - hydroxyphenoxy)-ethyl, β-(β′-acetylethoxycarbonyl)-ethyl, β-[(β′ - cyano)-ethoxycarbonyl]-ethyl, β-[(β′-hydroxy)ethoxycarbonyl]-ethyl, β-[(β′-methoxy)ethoxycarbonyl]-ethyl, β-[(β′-acetoxy)ethoxycarbonyl] - ethyl, β - carboxyethyl, β - acetylethyl, γ - aminopropyl, β - diethylaminoethyl, β - cyanoacetoxyethyl, β-benzoyl-hydroxyethyl, β-phenoxy-benzoylhydroxyethyl and only one of $R_1$ or $R_2$ being hydrogen at any one time; $R_3$ represents thienyl, tetrahydrofuryl, tetrahydrothienyl and substituted furyl or thienyl, wherein the substituent is selected from the group consisting of alkyl of up to 4 carbon atoms, chloro, carboxy, carbomethoxy, paranitrophenyl and parachlorophenyl, and X is hydrogen, methoxy, ethoxy or methyl.

2. A water-insoluble monoazo dyestuff as claimed in claim 1, wherein $R_3$ represents 5-carbomethoxythienyl.

3. A water-insoluble monoazo dyestuff as claimed in claim 1, corresponding to the formula

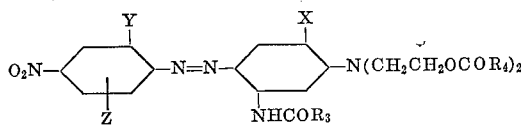

in which Y represents hydrogen, chloro, bromo, lower alkyl, lower alkoxy, nitro, cyano, lower carbalkoxy or phenylsulphonyl, Z represents hydrogen, chloro, bromo, lower alkyl, lower alkoxy, phenoxy, cyano or trifluoromethyl, $R_4$ represents lower alkyl or phenyl.

4. A water-insoluble monoazo dyestuff as claimed in claim 1 of the formula

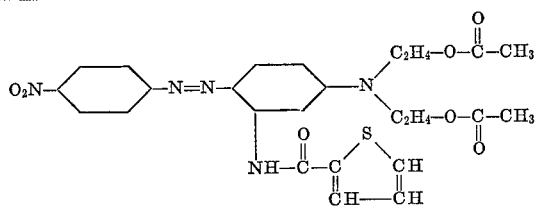

5. A water-insoluble monoazo dyestuff as claimed in claim 1 of the formula

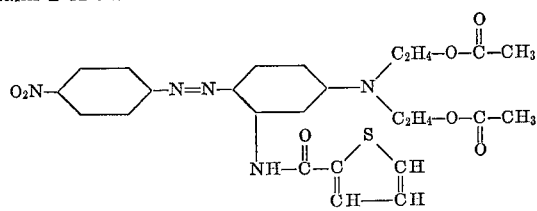

6. A water-insoluble monoazo dyestuff as claimed in claim 1 of the formula

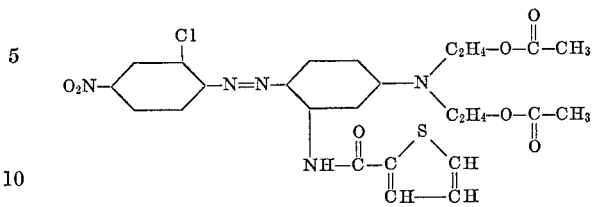

7. A water-insoluble monoazo dyestuff as claimed in claim 1 of the formula

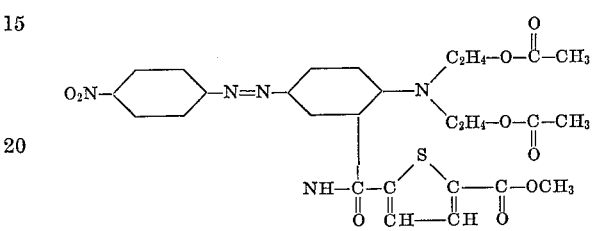

8. A water-insoluble monoazo dyestuff as claimed in claim 1 of the formula

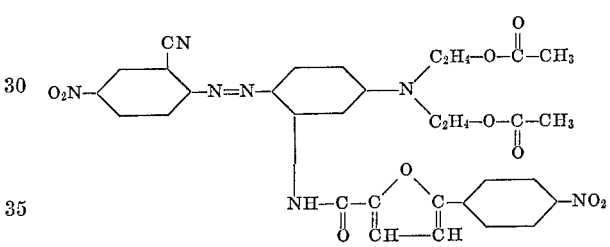

References Cited

UNITED STATES PATENTS

| | | | |
|---|---|---|---|
| 2,144,219 | 1/1939 | Etzelmiller | 260—152 |
| 2,543,745 | 3/1951 | Grimmel et al. | 260—152 X |
| 2,852,305 | 9/1958 | Long et al. | 260—152 |
| 3,157,667 | 11/1964 | Kern et al. | 260—152 X |
| 3,437,418 | 4/1969 | Huey et al. | 260—152 X |
| 3,433,952 | 5/1969 | Anderau | 260—152 X |

FLOYD D. HIGEL, Primary Examiner

U.S. Cl. X.R.

8—4, 27, 41 A, 41 B, 41 C, 50, 71; 117—138.8 R, 138.8 F, 138.8 UA, 143; 260—37 R, 37 N, 40 R, 41 R, 158 205, 207, 306.8 R 332.2 C, 347.3, 490

PO-1050
(5/69)

UNITED STATES PATENT OFFICE
CERTIFICATE OF CORRECTION

Patent No. 3,632,565        Dated January 4, 1972

Inventor(s) HANS-JOERG ANGLIKER ET AL

It is certified that error appears in the above-identified patent and that said Letters Patent are hereby corrected as shown below:

Column 14, lines 15-24, amend the middle of the formula to read:

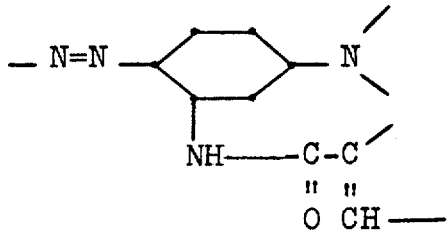

Signed and sealed this 1st day of August 1972.

(SEAL)
Attest:

EDWARD M. FLETCHER, JR.      ROBERT GOTTSCHALK
Attesting Officer             Commissioner of Patents